(12) United States Patent
Wood et al.

(10) Patent No.: US 8,249,397 B2
(45) Date of Patent: Aug. 21, 2012

(54) PLAYBACK OF DIGITAL IMAGES

(75) Inventors: Kenneth Wood, Cambridge (GB);
Stephen Hodges, Cambridge (GB);
Lyndsay Williams, Cambridge (GB);
James Srinivasan, West Yorkshire (GB);
Carsten Rother, Cambridge (GB);
Antonio Criminisi, Cambridge (GB)

(73) Assignee: Microsoft Corporation, Redmond, WA (US)

(*) Notice: Subject to any disclaimer, the term of this patent is extended or adjusted under 35 U.S.C. 154(b) by 791 days.

(21) Appl. No.: 12/096,281

(22) PCT Filed: Nov. 16, 2006

(86) PCT No.: PCT/US2006/044859
§ 371 (c)(1),
(2), (4) Date: Jun. 5, 2008

(87) PCT Pub. No.: WO2007/067334
PCT Pub. Date: Jun. 14, 2007

(65) Prior Publication Data
US 2008/0317386 A1 Dec. 25, 2008

(30) Foreign Application Priority Data
Dec. 5, 2005 (EP) .................................. 05257463

(51) Int. Cl.
*G06K 9/54* (2006.01)
*G06K 9/60* (2006.01)

(52) U.S. Cl. .................................................. 382/305
(58) Field of Classification Search .............. 382/305; 345/156
See application file for complete search history.

(56) References Cited

U.S. PATENT DOCUMENTS

| | | | |
|---|---|---|---|
| 6,813,394 B1 * | 11/2004 | Matsumoto et al. | 382/305 |
| 2003/0063198 A1 * | 4/2003 | Yokokawa | 348/231.2 |
| 2003/0068100 A1 * | 4/2003 | Covell et al. | 382/305 |
| 2005/0034084 A1 * | 2/2005 | Ohtsuki et al. | 715/864 |
| 2005/0062841 A1 * | 3/2005 | Rivera-Cintron | 348/14.02 |
| 2006/0056737 A1 * | 3/2006 | Ohtsuka et al. | 382/305 |
| 2006/0155761 A1 * | 7/2006 | Van De Sluis et al. | 707/104.1 |
| 2006/0259863 A1 * | 11/2006 | Obrador et al. | 715/723 |
| 2007/0097247 A1 * | 5/2007 | Yokokawa | 348/333.1 |

FOREIGN PATENT DOCUMENTS

| | | |
|---|---|---|
| EP | 1453293 | 9/2004 |
| JP | 2001230992 | 8/2001 |
| JP | 2003299028 | 10/2003 |
| JP | 2004310436 | 11/2004 |

* cited by examiner

*Primary Examiner* — John Strege
(74) *Attorney, Agent, or Firm* — Lee & Hayes, PLLC

(57) ABSTRACT

A method of displaying digital images is described in which a display length indicator is received and digital images are accessed. A set of digital images are selected from the accessed digital images in accordance with the display length indicator and displayed in a predetermined order. The method may be performed by a computer program, which may be embodied on a computer readable medium.

18 Claims, 19 Drawing Sheets

PLAYBACK OF DIGITAL IMAGES

RELATED APPLICATIONS

This application is a National Stage of International Application No. PCT/US2006/044859, filed Nov. 16, 2006, which claims priority from European Patent Application No. 05257463.9, filed on Dec. 5, 2005. Both applications are incorporated herein by reference.

BACKGROUND

Over the last few years, the use of digital cameras has increased enormously, with digital cameras now commonly being incorporated into other portable electronic equipment, particularly mobile telephones. Digital cameras allow users to take large numbers of photographs, knowing that they can be selective about which and how many images they may subsequently choose to print or otherwise retain. This results in a user having a large collection of digital images.

SenseCam is a wearable camera developed by Microsoft Research which can be used to assist with memory recall by enabling a user to rewind through the recent events experienced by the wearer of the device. This may be particularly useful for memory-impaired individuals, or where an individual has experienced a traumatic event (e.g. an elderly person's fall resulting in injury).

The device can capture very large numbers of images and in addition to capturing images, the device also records sensor data, such as movement, light level and temperature periodically. This sensor data is used to trigger the capturing of images, for example, when there is a change in light level or sudden movement. A change in light level may indicate that a user has moved from one room to another, or from inside to outside and therefore the image captured will indicate a change in location (and environment) of the wearer. The device has a wide angle or fish-eye lens so that the user does not need to worry about pointing the device in a particular direction. An accelerometer is used for image stabilisation.

Through use of a conventional digital camera or a Sense-Cam, a user may generate a huge collection of digital images that they may wish to view. Many software applications exist which allow users to browse their photographs via a directory structure or folder hierarchy and to view images within a directory/folder in the form of a filmstrip or a slide-show. The filmstrip view displays the images from a directory adjacent to each other along a horizontal line (arranged in alphabetical order by filename), with scroll bars allowing the user to move along the strip. The slide-show view displays the images within a directory sequentially according to an alphabetic listing by filename. Rapid Serial Visual Presentation (RSVP) techniques have also been developed which allow the user to flip through their photographs either in forward or reverse and at an adjustable speed. At slow speeds, the display is like a slide-show view and at fast speeds the display is more similar to a movie.

Although such views may work well in displaying directories containing tens of photographs, they may not be optimum for displaying directories containing much larger numbers of photographs. In particular problems may arise for a user trying to view images taken on a SenseCam, which may capture several hundred pictures (or potentially in excess of one thousand) images during a single day.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A first example provides a method of displaying digital images comprising the steps of: receiving a display length indicator; accessing digital images; selecting a set of digital images from the accessed digital images in accordance with the display length indicator and predefined selection criteria; and displaying the selected set of digital images in a predetermined order.

Advantageously, this method automatically reduces the number of images to be displayed to a user-defined level. This is particularly beneficial where the source of digital images is very large (e.g. hundreds of images). It makes searching the sequence for events simpler and more user-friendly.

Examples of predefined selection criteria, include, but are not limited to, selection according to date/time stamp of an image, position of an image in a sequence or the difference between images, or selection of a representative set of images.

Preferably, the digital images are digital photographs.

Preferably, the predetermined order is chronological order.

Advantageously, by displaying the images chronologically, the user has a representative view of the events recorded in the images and how they relate to each other, but without being overloaded with information.

Preferably, the display length indicator comprises one of: a number of images, a display time or an image difference threshold.

Advantageously, by specifying the display time, the user can tailor their viewing experience to their available time.

The accessing step may comprise the steps of: accessing digital images; and limiting the accessed digital images to images captured in a defined time period.

Preferably, the selecting step comprises the steps of: determining a number of images to be displayed from the display length indicator; and selecting the number of images from the accessed images in accordance with at least one of a time stamp associated with each image and a property of each image.

Preferably, the step of selecting the number of images comprises the steps of: selecting a first image from the accessed images according to specified criteria; selecting a further image from the accessed images which gives an extreme value of a predefined energy parameter; and repeating the step of selecting a further image until the determined number of images have been selected.

Advantageously, this selects a representative set of images from the accessed images to be displayed. The display therefore provides the user with a good representation of the activities/scenes captured in the digital images. Depending on the energy parameter which is predefined, the extreme value may be the maximum value or the minimum value.

Preferably, the energy parameter is defined with respect to an importance factor and a similarity factor, and wherein the importance factor is a measure of one or more image attributes and a similarity factor is a measure of the difference between two images.

Preferably, the importance factor is a measure of one of more of: presence of a face in an image; degree of interest of an image; and sharpness of an image.

Preferably, the step of displaying comprises: displaying the selected set of digital images sequentially in the predetermined order.

The method may further comprise the steps of: accessing audio clips; selecting one or more audio clips associated with the selected digital images; and playing the selected audio clips in parallel to the step of displaying the selected set of digital images.

The method may further comprise the steps of: accessing sensor data; selecting parts of the sensor data associated with the selected digital images; processing the selected parts of sensor data to provide a sensory feedback signal; and outputting the sensory feedback signal in parallel to the step of displaying the selected set of digital images.

Advantageously, the provision of a sensory feedback signal provides a viewer with an enhanced experience and enables the viewer to better appreciate the activities shown in the images.

Preferably, the sensor data comprises acceleration data; the sensory feedback signal comprises a low frequency audio signal and the step of outputting comprises: outputting the low frequency audio signal to a sensory actuator in parallel to the step of displaying the selected set of digital images.

Preferably, the step of processing the selected parts of sensor data comprises: accessing an audio clip; filtering the audio clip using a low pass filter to produce a low frequency audio signal; and controlling the amplification of the low frequency audio signal according to the acceleration data.

The method may further comprise the step of: playing the audio clip in synchronicity with outputting the low frequency audio signal to a sensory actuator.

Preferably, the sensory actuator comprises a bass speaker.

Advantageously, the sensory feedback can be provided without requiring dedicated equipment.

A second example provides a computer program comprising computer program code means adapted to perform all the steps of any of the methods described above when the program is run on a computer.

The computer program may be embodied on a computer readable medium.

A third example provides an apparatus for displaying digital images comprising: a user input device; a processor arranged to receive a display length indicator from the user input device, to access digital images and to select a set of digital images from the accessed digital images in accordance with the display length indicator and predefined selection criteria; and a display for displaying the selected set of digital images in a predetermined order.

Preferably, the predetermined order is chronological order.

A further example provides a method of providing sensory feedback to a viewer of one or more digital images, the method comprising: accessing a source of sensor data; selecting parts of sensor data associated with at least one of the one or more digital images; processing the selected parts of sensor data to provide a sensory feedback signal; and outputting the sensory feedback signal to an actuator.

Another example provides a user interface comprising: a first element arranged to indicate a display length indicator; a second element arranged to indicate a location of digital images and an input for initiating display of a set of images selected from the digital images, the set of images being selected in accordance with the display length indicator and predefined selection criteria.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilised. The description sets forth the functions of the example and the sequence of steps for constructing and operating the example. However, the same or equivalent functions and sequences may be accomplished by different examples.

Figure 1:
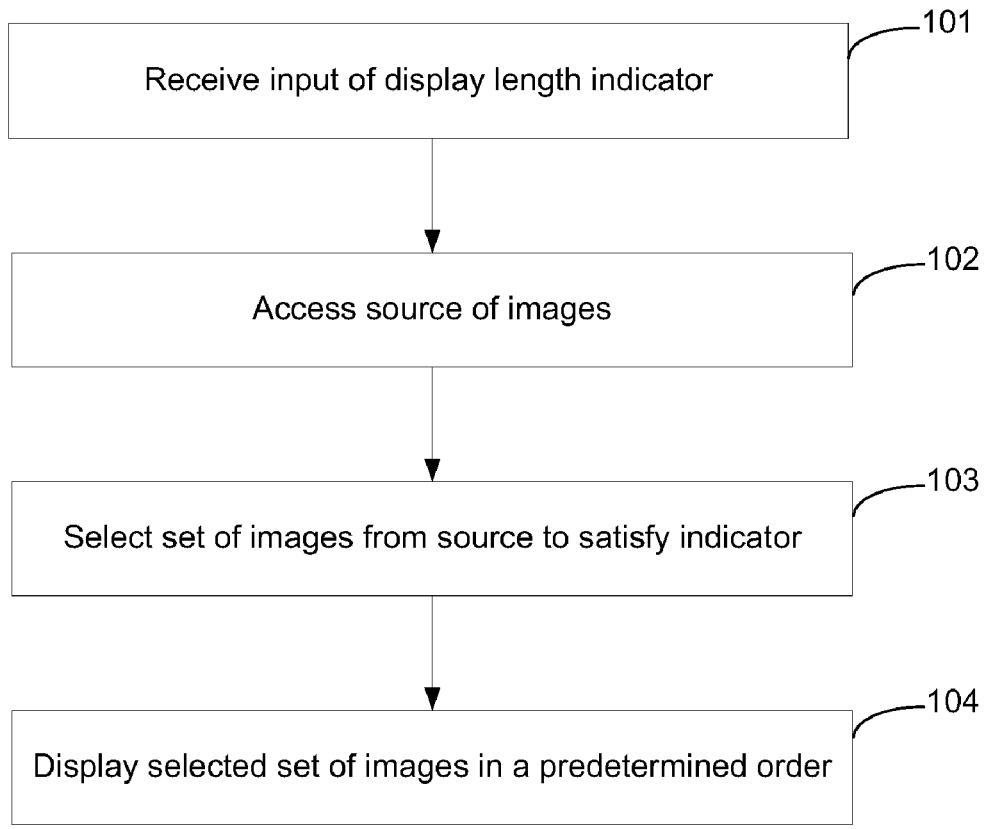
FIG. 1 is an example flow diagram of a method of playback of digital images.

FIG. 1 is an example flow diagram of a method of playback of digital images (e.g. digital photographs). The user inputs information that provides an indicator of the display length required (step 101). This indicator may be in terms of a required display length in time (e.g. in seconds or minutes), in terms of the number of images to be displayed, or other parameter, such as an indication of the minimum difference between two images being displayed (e.g. a minimum SAD of 20, see discussion below). A source of images is accessed (step 102), where each image has associated with it a date/time stamp detailing when the image was captured/taken, (e.g. stored as an attribute of a JPEG image). A set of images is then selected from the source according to the display length indicator (step 103). The selected set of images are then displayed in a predetermined (e.g. chronological) order (step 104) starting with the first of the selected images to be taken and finishing with the last of the selected images to be taken (as defined by the date/time stamp of the image). These steps are described in more detail below.

Figure 2:
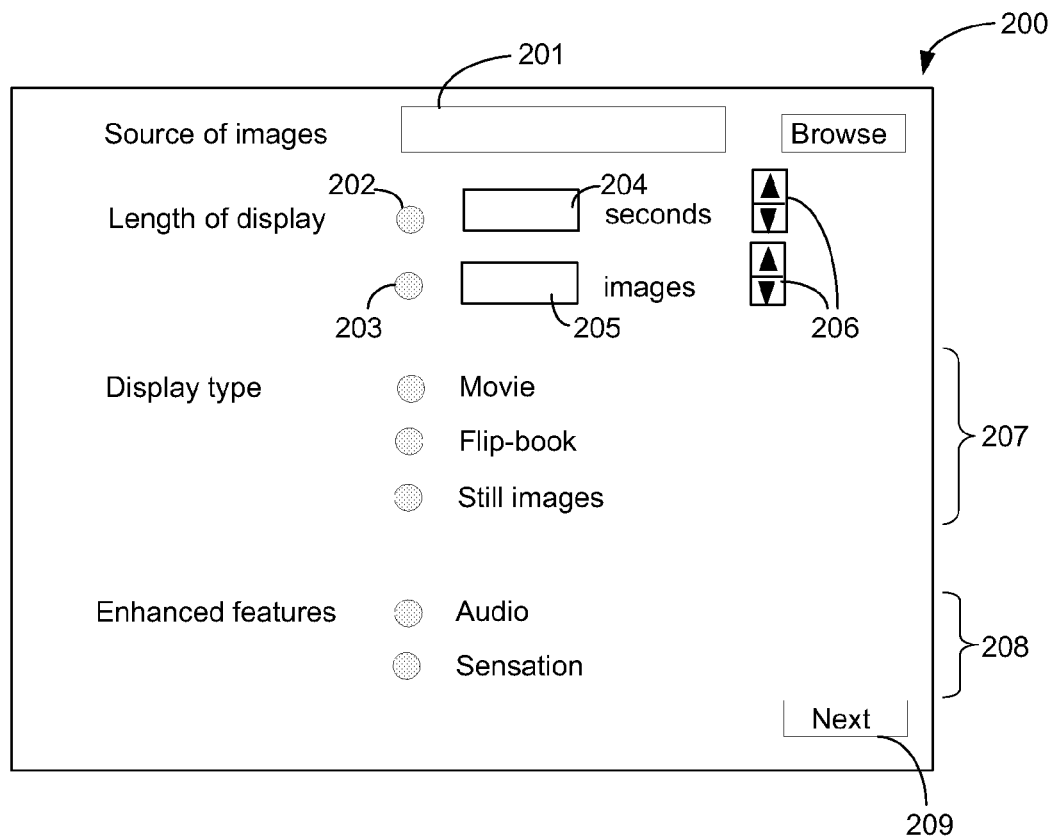
FIGS. 2-4 show examples of user interfaces.
Figure 3:
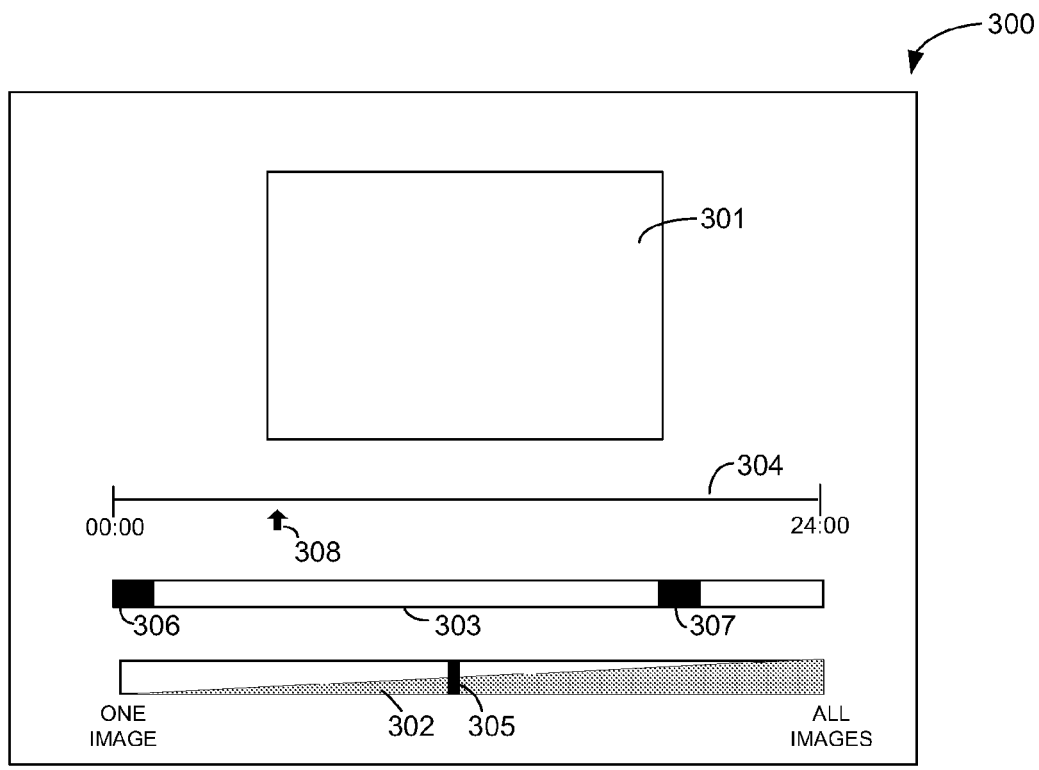
Figure 4:
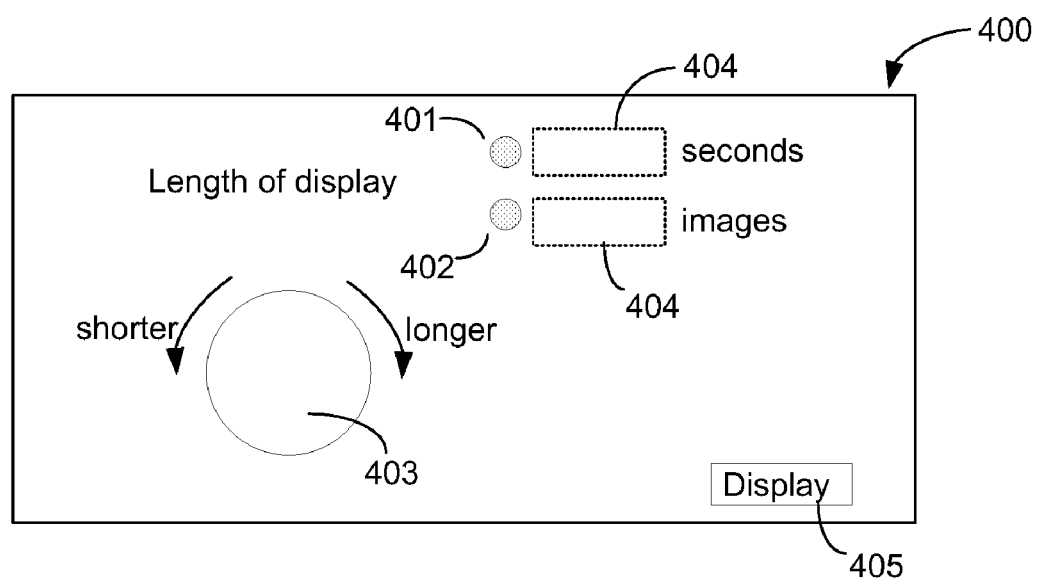

FIGS. 2-4 show examples of user interfaces (UIs) which could be used by the user to input the display length indicator (for step 101). FIG. 2 shows a first example UI screen 200 in which the user can specify the location of the images (box 201). The images may be stored in a single directory or across multiple directories, furthermore they may be stored on the computer running the display application or remotely and accessed via a network, an intranet or the internet. In this example the user is given two options for units for the display length indicator—time (selected using button 202) or number of images (selected using button 203). In either case the user can either enter directly the number required (in boxes 204, 205) or use the arrow buttons 206 to set the display length indicator. In addition to selecting the display length indicator, the user can also select the display type required (screen portion 207) and some enhanced features (screen portion 208). The display type and the enhanced features will be explained in more detail below. The display length indicator is input (for step 101) when the 'Next' button 209 is clicked on by the user.

FIG. 3 shows a second example UI screen 300, which has an image display region 301 below which is are two sliders 302, 303 and a time line 304. The first slider 302 enables the user to specify the display length indicator by clicking and dragging the bar 305 sideways. If the user moves the bar 305 to the left, the display indicator gets smaller and if the user moves the bar 305 to the right, the display indicator is increased. The second slider 303 allows the user to indicate a time period over which the display is to be based and has two adjustable markers 306, 307 which can be moved to set the start and end times respectively with respect to the time line 304 above. During the playback of the selected images (in step 104) an arrow 308 moves along the time line 304 to indicate to the user when the image being displayed was taken. A user can click on the arrow at any time to pause the display. In this example, the display length indicator may be input automatically (for step 101) whenever the value is changed by the movement of the bar 305 along the slider 302. The input of the new display length indicator (step 101) will cause the display of images to re-start (step 104) using the new display parameters and a newly selected set of images (selected in step 103).

FIG. 4 shows a third example UI screen 400, in which, as in FIG. 2, the user is given two options for units for the display length indicator—time (selected using button 401) or number of images (selected using button 402). In this example the value of the display length indicator is set by turning the dial 403 with the value of the indicator, and hence the length of the display, being increased when the dial 403 is turned clockwise and decreased when the dial 403 is turned counter-clockwise. The value of the display length indicator is displayed in the appropriate box 404. As in FIG. 2, the display length indicator is input (for step 101) when the user clicks a button, in this example the 'Display' button 405.

Figure 5:
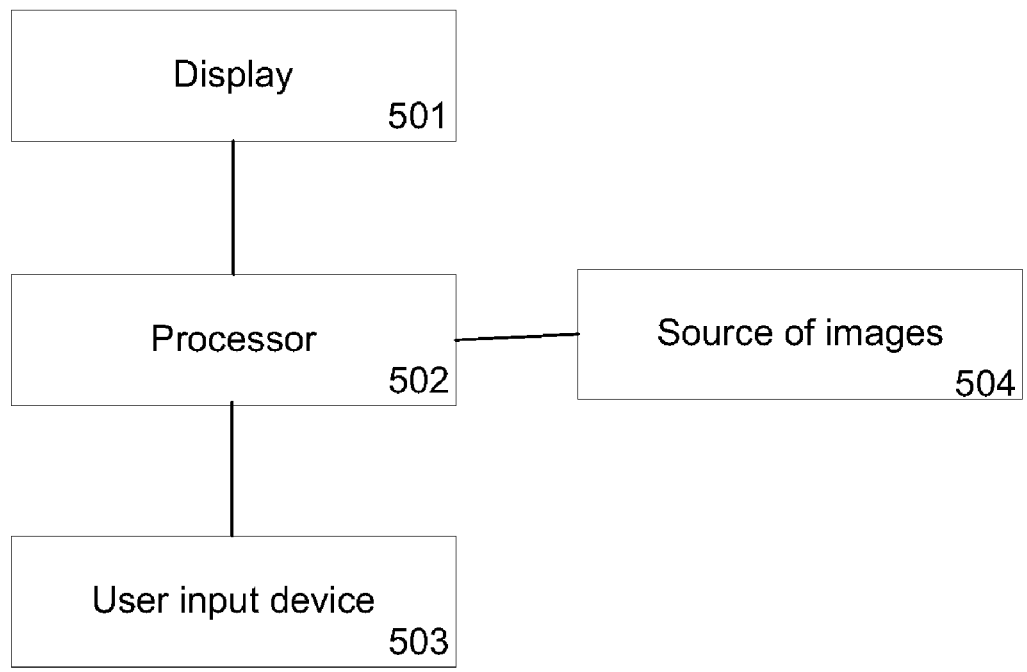
FIG. 5 shows a schematic diagram of an arrangement for playback of digital images.

FIG. 5 shows a schematic diagram of an arrangement for playback of digital images according to the method shown in FIG. 1, comprising a display 501, a processor 502, a user input device 503 and a source of images 504. The display 501 is used to display the UI (e.g. as shown in FIGS. 2-4) and the images. The processor 502 receives an input of the display length indicator from the user input device 503 (step 101), accesses the source of images 504 (step 102), selects a set of images for display from the source (step 103) and then outputs this selected set to the display 501 (step 104). The display 501, processor 502 and user input device 503 may all be integrated into a digital camera and the playback may therefore occur on the camera that took the Images (i.e. the digital photographs). In another example, the processor 502 may be part of a computer that is attached to a monitor (display 501) and a keyboard and/or mouse (user input device 503).

As described above, the step of accessing the source of images (step 101) may involve accessing one or more directories located in one or more places. The images may be stored locally, e.g. within the same device as the processor, or they may be stored elsewhere, for example on a remote computer, on a server or on a web site. The location of the source of images may be specified by the user via the UI, for example box 201 in FIG. 2. The source of images may be constrained further than just by the directory in which the images are stored. As shown in FIG. 3, a user may further specify the date/time range of the images of interest, e.g. using slider 303. This user input serves to restrict the source of images in addition to any file directories which may have been identified by the user (e.g. via box 201 in FIG. 2).

Figure 6:
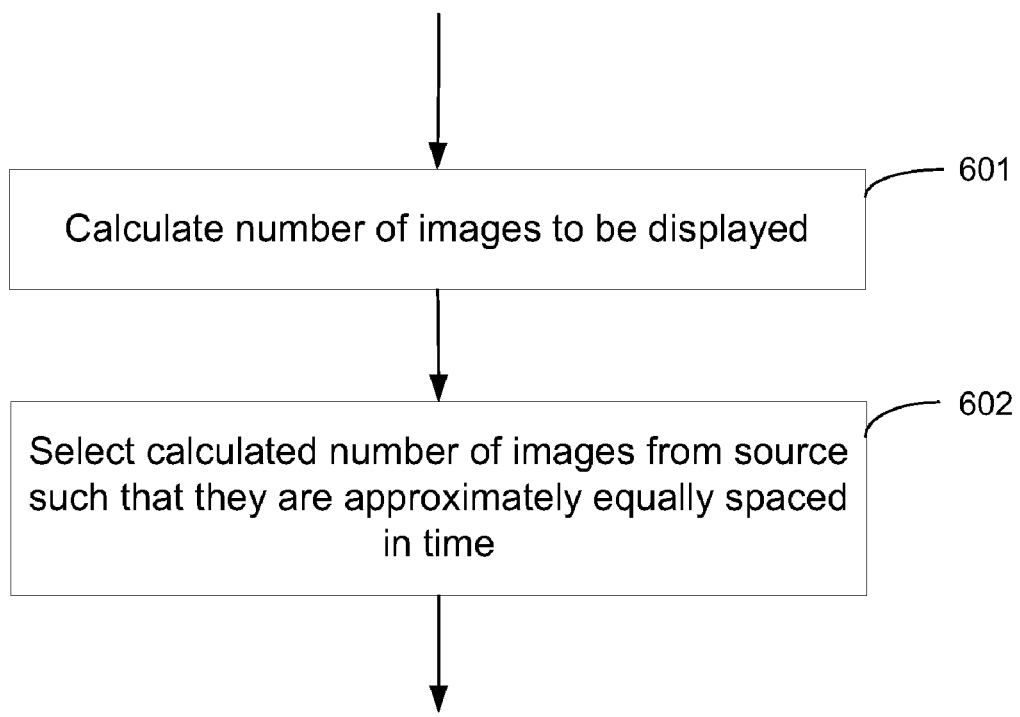
FIG. 6 is an example flow diagram for a method of selecting a set of images.
Figure 7:
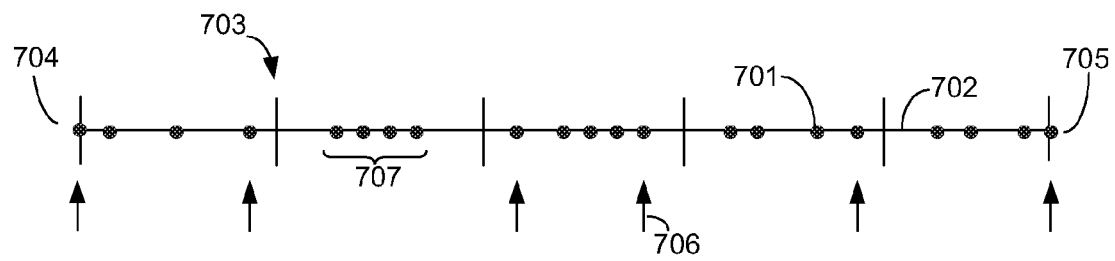
FIG. 7 is a schematic diagram illustrating the selection method shown in FIG. 6.

The selection of a set of images from the source to satisfy the display length indicator (step 103) may be achieved using different methods and three possible methods are described here:

Selection according to time/date stamp
Selection according to position in sequence
Selection of a representative set of images A first method of selection, in which the selection is made according to time/date stamp of the images, can be described with reference to FIGS. 6 and 7. First the number of images to be displayed is calculated (step 601). This number may be directly available from the display length indicator if the unit 'images' was used. Alternatively, this may be calculated by dividing the required display time by a defined image display time (e.g. 1 second). Having calculated this figure (this is 6 for the example shown in FIG. 7), the required number of images are selected from all those in the source so that the selected set are as evenly distributed across the period of time covered by all the images as possible. FIG. 7 shows each image as a circle 701 on a timeline 702. The vertical marks 703 show the six equally spaced points along the timeline between the first image in the source 704 and the last image in the source 705. The images indicated by an arrow 706 are those which are closest in time to one of the vertical marks 703. Although this method provides images which are well spaced in time throughout the period of interest, the selected images may not be representative and may miss clusters of images (e.g. cluster 707) if they fall at the wrong point along the timeline.

Figure 8:
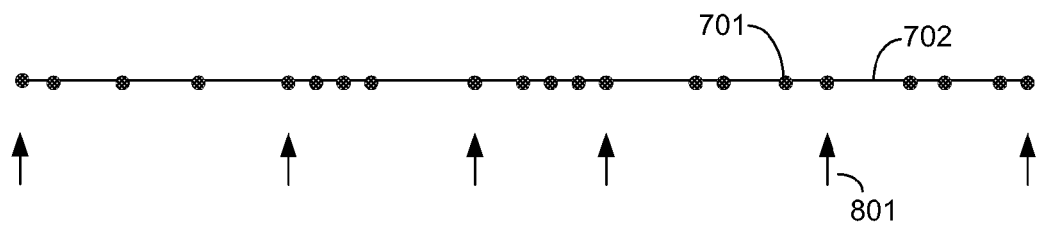
FIG. 8 is a schematic diagram illustrating another example of a selection method.

A second method of selection, in which the selection is made according to the position of the images in the sequence, can be described with reference to FIG. 8. First the number of images to be displayed is calculated, in the same manner as described above (step 601). Having calculated this figure (this is also 6 for the example shown in FIG. 8), the required number of images are selected from all those in the source so that the selected set are as evenly selected from the sequence of images as possible. FIG. 8 shows each image as a circle 701 on a timeline 702 (as in FIG. 7). The $1^{st}$, $5^{th}$, $9^{th}$, $13^{th}$, $17^{th}$ and final ($21^{st}$) images are selected as indicated by an arrow 801. Although this method provides images which are well spaced throughout those in the source, the selected images may still not be representative of the whole set of 21 images.

The third selection method selects a representative set of images from those within the source. If the source comprises n images, a vector x is defined which has n elements, where x(i)=1 if image i is selected as one of the representative set of images and otherwise x(i)=0. Consequently, if 10 images are to be selected from a source comprising 100 images, the vector x will have 100 elements (n=100) of which 10 elements will be equal to one and 90 elements will be equal to zero.

In order to select a representative set of N images, an energy, E is defined as:

$$E=\Sigma_i Imp(i)\delta(x(i)=1)+\lambda_{Sim}\Sigma_i \min_j Sim(i,j)\delta((x(i),x(j))=(1,1))$$

Where:
δ(arg)=1 if arg is true, otherwise δ(arg)=0
$\lambda_{Sim}$ is a constant and an example value is 100
Sim(i,j) is the similarity between two images. Two identical images i,j have Sim(i,j) equal to zero, two very different images i,j have a high value for Sim(i,j). This is defined as the distance between two images, e.g. the sum of absolute differences (SAD) of the texton histogram of the two images (described in more detail below). A texton histogram is used, as described below, because it looks at both the colour and texture in an image. In another example, a colour histogram could be used to compare just the distribution of colours of pixels in particular images.
Imp(i) is the importance of an image, with the value being high for images which are considered important. In one example it may be defined as:

$$Imp(i)=\text{weightFaces}+Entropy(i)$$

Where:
weightFaces=0.008 if there is a face in the image, otherwise weightFaces=0. An example of a suitable face detection algorithm is described in a paper by P. Viola and M. Jones entitled 'Robust Real-Time Object Detection' presented at the International Conference on Computer Vision (ICCV) 2001.

$$Entropy(i)=-\Sigma_{c=1}^m \Sigma_{i=1}^k p_i^c \log(p_i^c)$$

Where:
Entropy(i) is a measure of how interesting a picture is (e.g. a uniform colour image would be of low interest, whilst a detailed, multi-coloured image is of high interest).
k is the total number of pixels
m is the number of image channels (e.g. RGB image has 3 channels)
$p_i^c$ is the value of pixel i in channel c.

In the above equations, an image is considered important if there are faces in the image and if the image has high entropy, i.e. a high interest level. Other factors may be used instead, or in addition, to determine the importance of an image. For example, the sharpness of an image could be included, with blurred images having a very low value (e.g. 0) and sharp images having a higher value. Images with audio clips associated with them (as described below) may be considered important and therefore this may be included within the entropy calculation. A user may be able to define which aspects of an image they consider to be more important than others (e.g. sharpness vs. presence of faces), e.g. via a UI.

Figure 9:
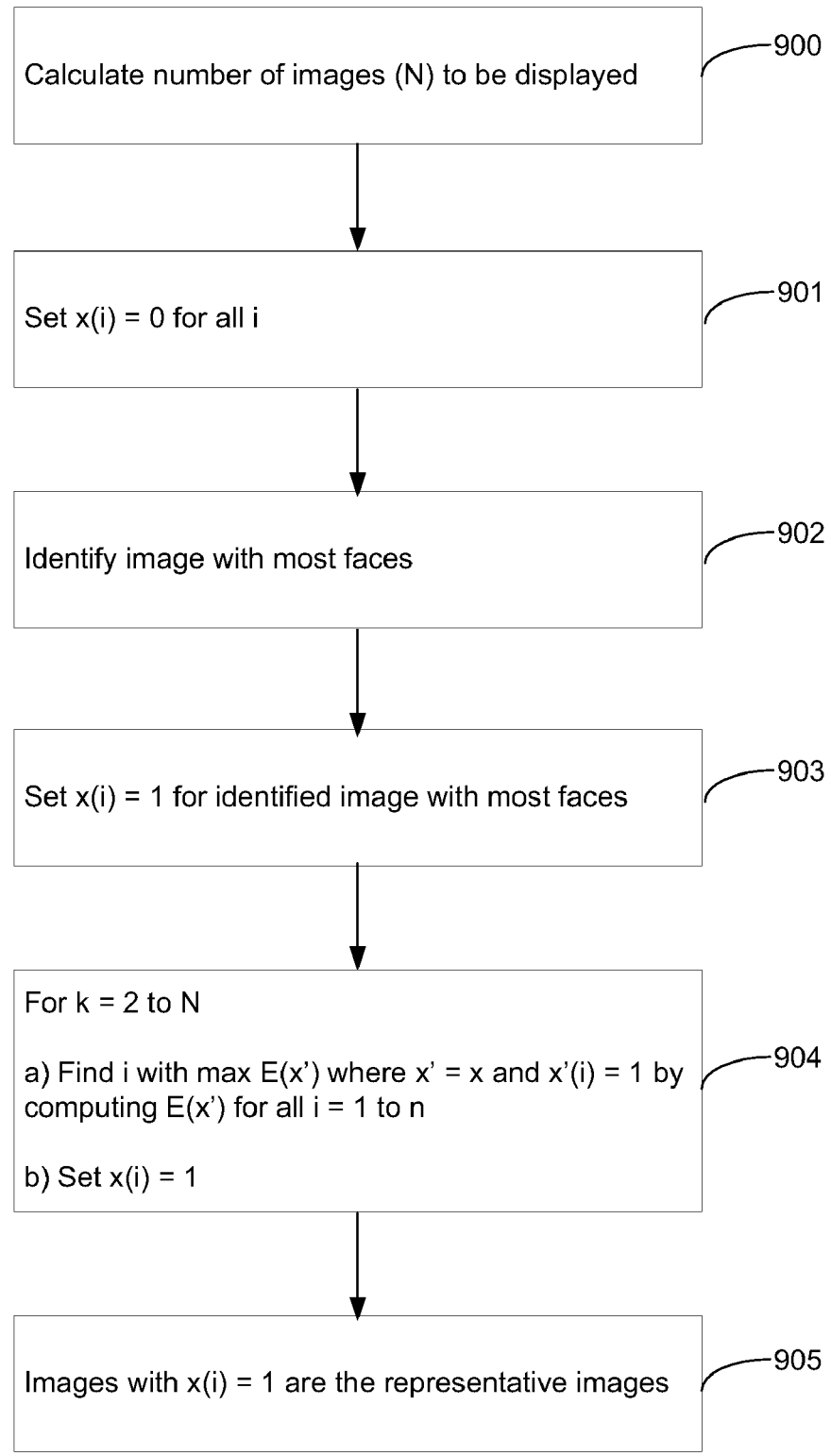
FIG. 9 is an example flow diagram for a method of selecting a representative set of images.

In order to select a set of representative images, the maximum value of the energy E must be found. This optimisation may be performed as shown in FIG. 9 by selecting one image at a time. First the number of images to be displayed, N, is calculated (step 900) as described above (with reference to step 601 in FIG. 6). Next x(i) is set equal to zero for all i, (step 901). The image with the most faces is the first image selected (step 902) and for this image, x(i) is set equal to one (step 903). Then, one by one the remaining N−1 images are selected by finding the image (the i) which gives the maximum energy E (step 904, which comprises parts 904a and 904b). To select the second image, all the remaining n−1 images are examined in turn and the value of E calculated to find which image (which i) gives the maximum value (step 904a) and once identified the value of x(i) for this second selected image is set equal to 1 (step 904b). This is then repeated to select the third image, with all the remaining n−2 images being examined in turn and the value of E calculated to find which image (which i) gives the maximum value (step 904a) and once identified the value of x(i) for this third selected image is set equal to 1 (step 904b). This is then repeated until N images have been selected and these are the ones which, in the vector x, have x(i)=1 (step 905).

In order to perform the above calculation of values of E (in step 904a), it is necessary to calculate the values of Sim(i,j). As described above, this is defined as the distance between two images, e.g. the sum of absolute differences (SAD) of the texton histogram of the two images. In order to calculate the SAD of the texton histogram of the two images, i and j, a universal vocabulary of textons is required. This is defined on the basis of many training images and the vocabulary is typically application dependent, so the training images are preferably of a similar type to the actual images that will be in the source. For example images taken by a SenseCam have distinctly different properties from images taken by a conventional digital camera. Consequently, it would be appropriate to use SenseCam images as training images when a source of SenseCam images is to be used and standard digital camera images should be used as training images when a source of standard digital camera images is to be used. Where other types of images are to be selected from, an appropriate set of representative images should be used as the training images in order to define the universal vocabulary.

Figure 10:
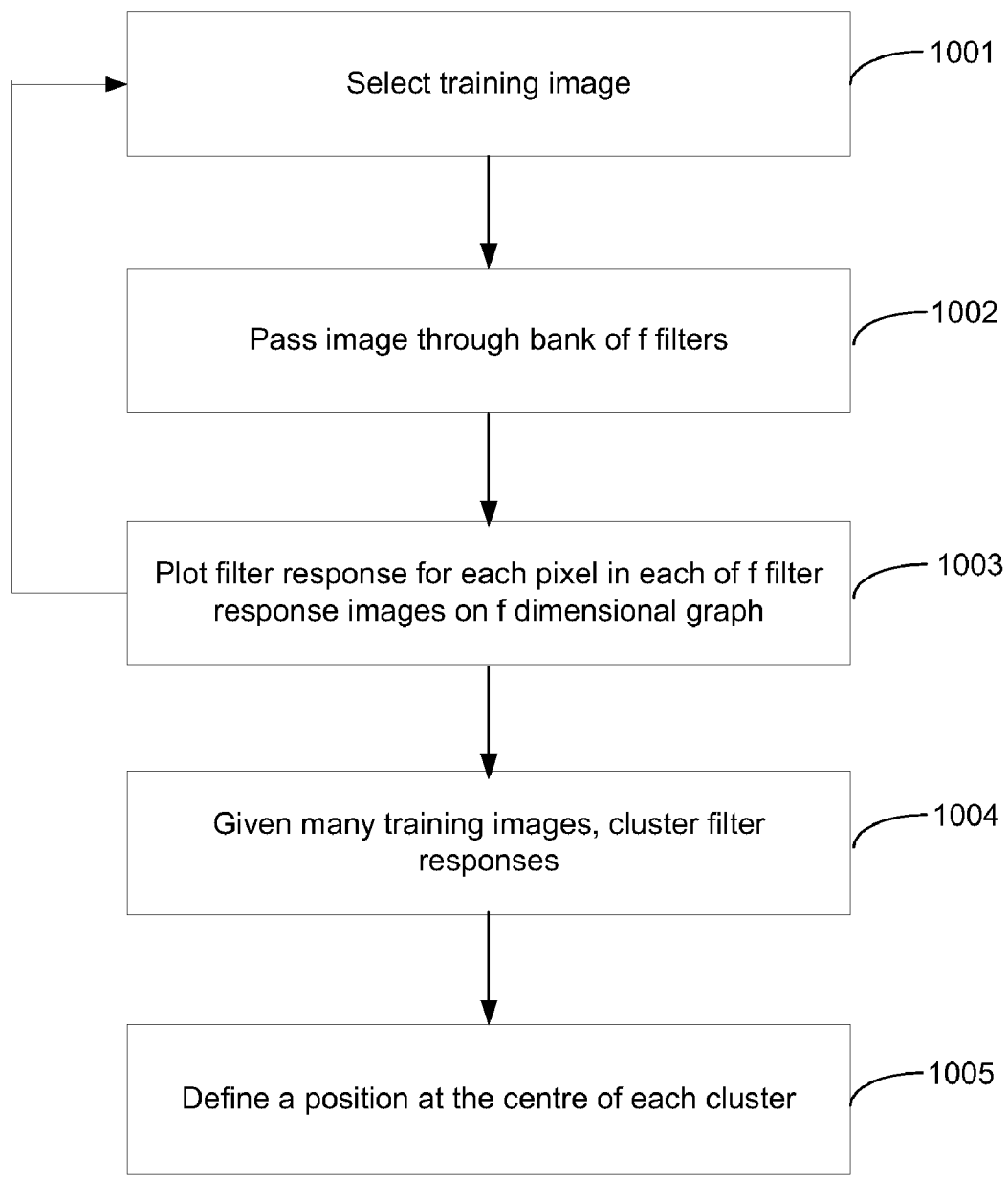
FIG. 10 is an example flow diagram showing a process for defining a universal texton vocabulary.
Figure 11:
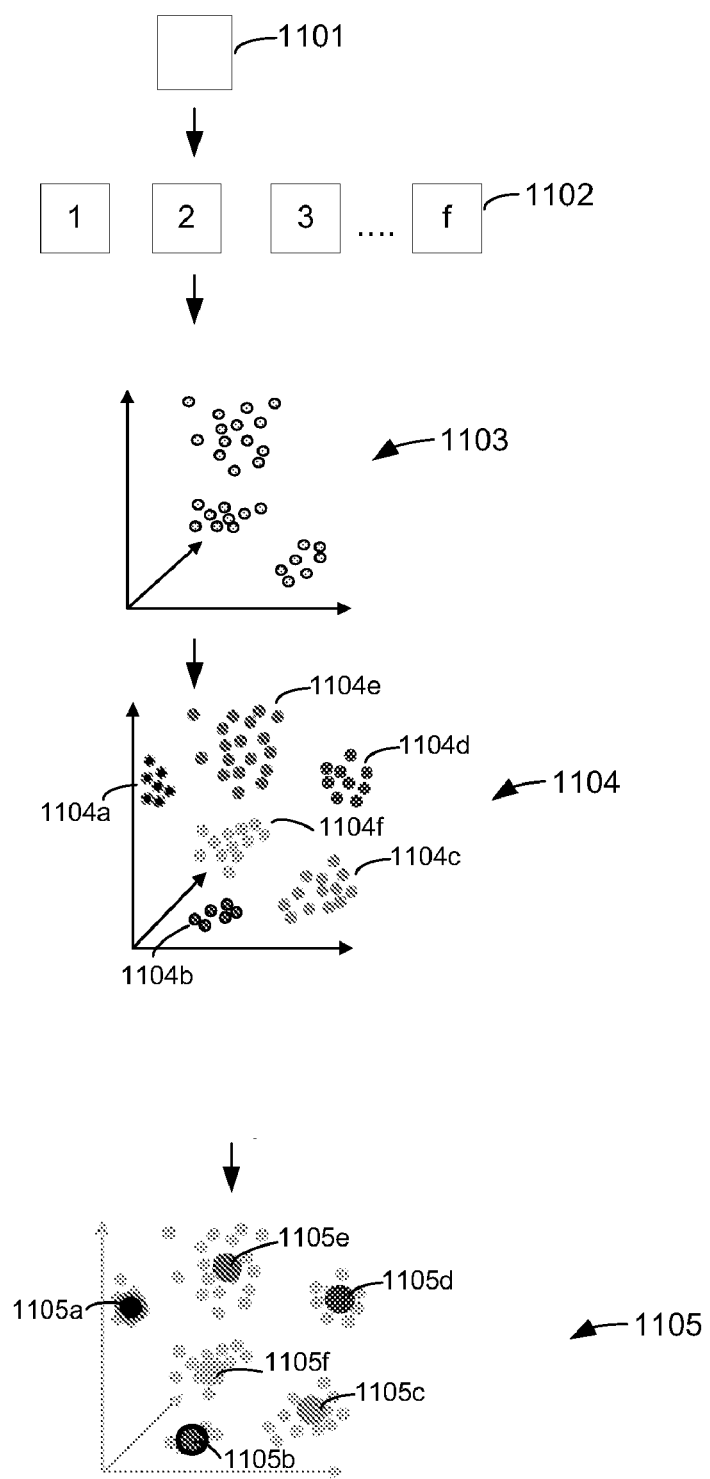
FIG. 11 is schematic diagram of stages in the process for defining a universal texton vocabulary shown in FIG. 10.

The process of defining the universal vocabulary can be described with reference to FIGS. 10 and 11. A first training image 1101 is selected (step 1001) and this image is passed through a bank of filters (step 1002), such as a bank of Gabor filters, where f is the number of filters used. It is the use of filters in this manner which enables texture information to be obtained. The filters typically capture information from an area of 10×10 pixels around each pixel. Typically a bank of 17 filters are used, (f=17) and the same filter set can be used for any application or any image type. The output of this step (step 1002) is a set of filter response images 1102, one image for each filter (i.e. f filter response images). The filter response of each pixel in each filter response image is then plotted in f dimensions (step 1003). Considering a particular pixel at position (x,y) in the original training image 1101, there are f filter responses, one for each filter in the bank (i.e. the filter response at position (x,y) in each of the f filter response images 1102). This creates a vector with f elements, ($r_1$, $r_2$, $r_3$, . . . $r_f$) which can then be plotted on the f-dimensional graph 1103. These three steps (1001-1003) are then repeated many times with different training images and all the points are plotted on the same graph 1104. Clusters 1104a-f of points on the graph are then identified (step 1004), for example using the k-means algorithm, and a position 1105a-f at the centre of each cluster is defined (step 1005). The result is therefore a set of vectors, each comprising f elements, each defining the position at the centre of a cluster. This set of vectors (6 vectors in the example shown in FIG. 11, although typically there are 50 vectors or 'visual words') is the universal vocabulary of textons (for images of the same type as the training images used). Each visual word (or vector) results in a bin in the texton histogram, as described below. A small number of words (and hence bins) results in faster processing speed when performing the comparison between images, however, a larger number of words provides a better measure of the differences or similarities between images.

Figure 12:
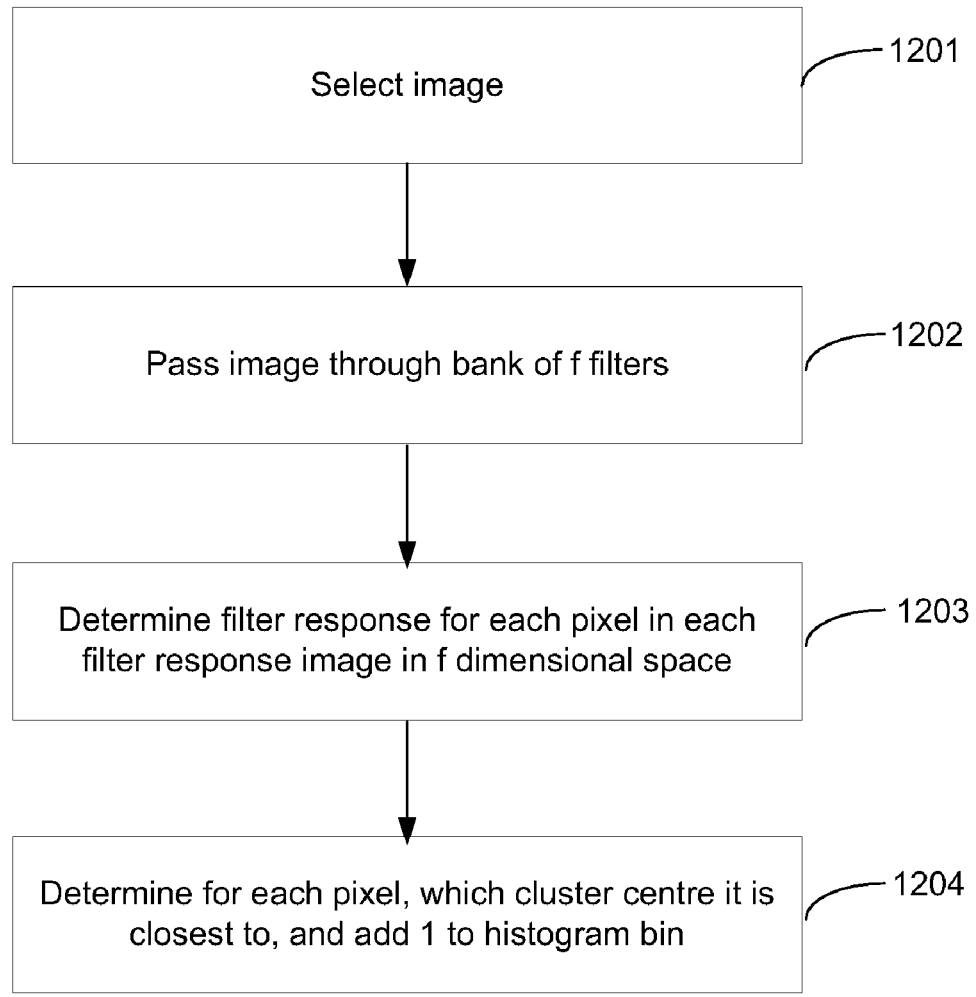
FIG. 12 is an example flow diagram showing a method for determining a texton histogram of an image.
Figure 13:
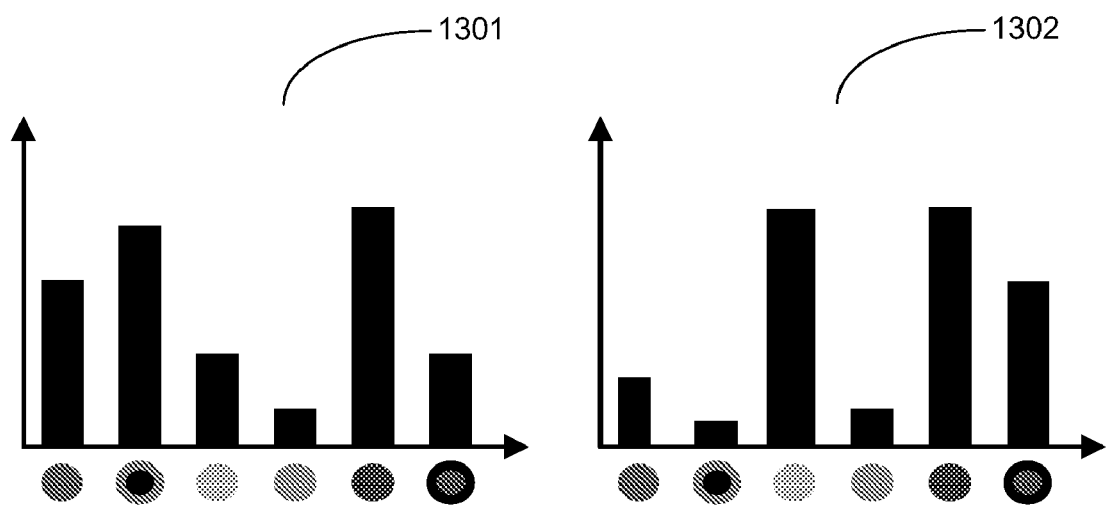
FIG. 13 shows two examples of texton histograms.

Having determined the universal vocabulary of textons, the texton histogram of an image can be calculated, as shown in FIG. 12. The image is selected (step 1201) and passed through the same bank of f filters used in determining the universal vocabulary (step 1202). The filter response for each pixel of the image is then determined for each of the f filters to provide a position in f-dimensional space (step 1203) and then this position is compared to the universal vocabulary (e.g. the 6 visual words shown in 1105) to determine which cluster centre position (defined in step 1005) each pixel is closest to. The results are plotted on a histogram with one bin for each visual word and with one entry per bin for each pixel which is closest to that visual word. Examples of two texton histograms 1301, 1302 are shown in FIG. 13. The SAD of texton histogram of the two images, i and j, can then be calculated (i.e. the sum of the absolute differences between the size of each bin) and this gives the value for Sim(i,j) which is used to calculate the Energy, E, as described above.

In the above description, the energy parameter, E, is defined such that a maximum value is sought in the process of determining representative images. It will be apparent to a person skilled in the art, that alternative expressions may be used for an energy parameter and depending on the expression selected, either a maximum value or a minimum value may be sought in order to determine representative images.

Having selected the set of images to display (step 103), for example using one of the three methods described above, the selected set of images can be displayed in chronological order (step 104). There are many different ways in which the images can be displayed and the display type used may be selected by the user (see section 207 of the user interface shown in FIG. 2).

The images may be displayed sequentially, for example using slideshow or RSVP techniques, and depending on the speed of display of each image, this may appear to the viewer as a slideshow display (slow speeds), a flip-book like display (medium speeds) or a movie (fast speeds). The time between display of each image may be constant (e.g. one image every second) or there may be variation in the time between display to provide an indication to the user of the actual time difference between image capture times for the two images. For example, if a first image is captured at 9 am, a second at 10 am and a third at 2 pm, then if the first image is displayed at t=0, the second at t=1, then the third image may be displayed at t=1.2 so that the user is given an indication that the time gap between the taking of the second and third images is much larger than the time gap between the taking of the first and the second images.

In another example, some or all of the selected images may be displayed side by side, depending on the available display area. The images may be displayed in a grid or may be displayed along a single line analogous to a film-strip. A scroll bar may be provided where not all the images can be displayed in the available display area, or images may be resized to fit the available display area.

In some display examples, a time line may be shown whilst the images are displayed to indicate to the viewer when an image was taken, as shown in FIG. 3 (time line 304). A standard time line (or trackbar) may be used which has a linear scale with equidistant tick marks, i.e. the gap between tick marks is constant (e.g. 10 minutes), as shown in FIG. 7 (tick marks 703). In another example, a modified time line (or trackbar) may be used in which tick marks (or other indicators) are used to denote scene changes. These scene changes may be detected by comparing two adjacent images, i and i+1, and calculating the SAD (as described above). If the SAD exceeds a threshold (which may be configurable), a scene break is designated and a tick mark placed on the time line at that point. These tick marks may still be displayed on a linear time line, however, they will not be spaced equidistantly. Such a modified time line enables a user to move forwards/backwards easily through the different scenes shown in the sequence of images. In other examples, change of scene markers may be used separately to a time line and may be shown as flags or labels within a flip-book or movie-like presentation of a sequence of images.

In other display examples, a combination of simultaneous and sequential display may be used. An example of this combination of display techniques can be described with reference to FIG. 14 which shows an example display screen 1400 and FIG. 15 which shows another example flow diagram of a method of playback of digital images. An input of a display length indicator is received (step 101), a source of images is accessed (step 102) and a set of images is selected from the source to satisfy the display length indicator (step 103), as described above. In this example, three representative images are selected (in step 103). A cluster of images is then selected around each of the three representative images (step 1501). These clusters are not the same as the clusters referred to with reference to FIGS. 10-13. The images within a cluster are selected such that they are similar to the representative image and this may be done using the calculation of the SAD of texton (or colour) histograms, as described below. A threshold may be defined such that if the SAD is below the threshold the image is considered similar. Alternatively or in combination with this, a maximum cluster size may be defined such that, for example, the 10 most similar images are selected (unless there are less than 10 similar images in which case the cluster will contain less than 10 images). The images within a cluster are also selected such that they were taken close in time to the representative image. For example, if the source comprises 100 images, numbered in chronological order from 1 to 100, and images 2, 30 and 89 are selected as the three representative images (in step 103), then the cluster of images for image 2, might contain images (if considered similar) from the range of images 1-29, but would not contain an image in the range 30-100 even if the image was very similar. Furthermore if images 1-8 were taken within 20 minutes of each other and image 9 was taken two hours after image 8, then the cluster of images for image 2 might contain images (if considered similar) from the range of images 1-8, but may not contain image 9 or subsequent images.

Having selected a cluster associated with each representative image, the selected images within each cluster are then displayed in chronological order (step 104) with the first cluster being displayed sequentially in the first display area 1401, the second cluster being displayed sequentially in the second display area 1402 and the third cluster being displayed sequentially in the third display area 1403. The display speed for the images within each cluster may be different such that the total time to display each cluster is equal (i.e. a cluster containing 10 images will need to display images twice as fast as a cluster containing 5 images) and again the display time for each image within a cluster may be the same or there may be variation within a cluster according to the time each image was taken, as described above. The speed of the sequential display may be slow (like a slideshow), fast (like a movie) or anywhere in-between.

In another example, the sequential display of a cluster may be user controlled, for example, by hovering a mouse pointer over one of the display areas 1401-1403. In a further example, each cluster may be shown sequentially, either in one display area (e.g. display first cluster, then second cluster, then third cluster) or in multiple display areas (e.g. display first cluster in area 1401, followed by second cluster in area 1402 whilst the representative image is displayed in area 1401 etc).

Figure 14:
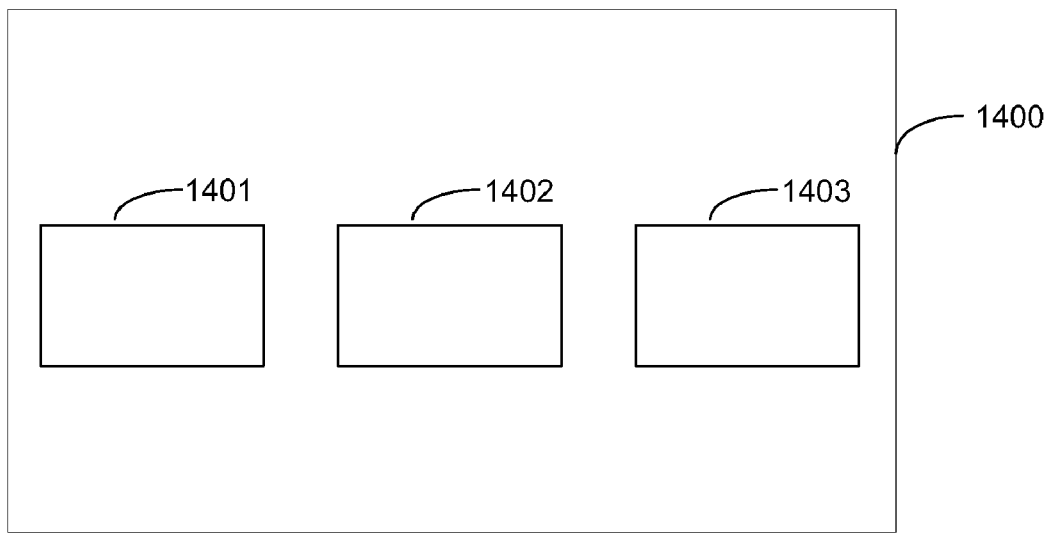
FIG. 14 shows an example display screen.
Figure 15:
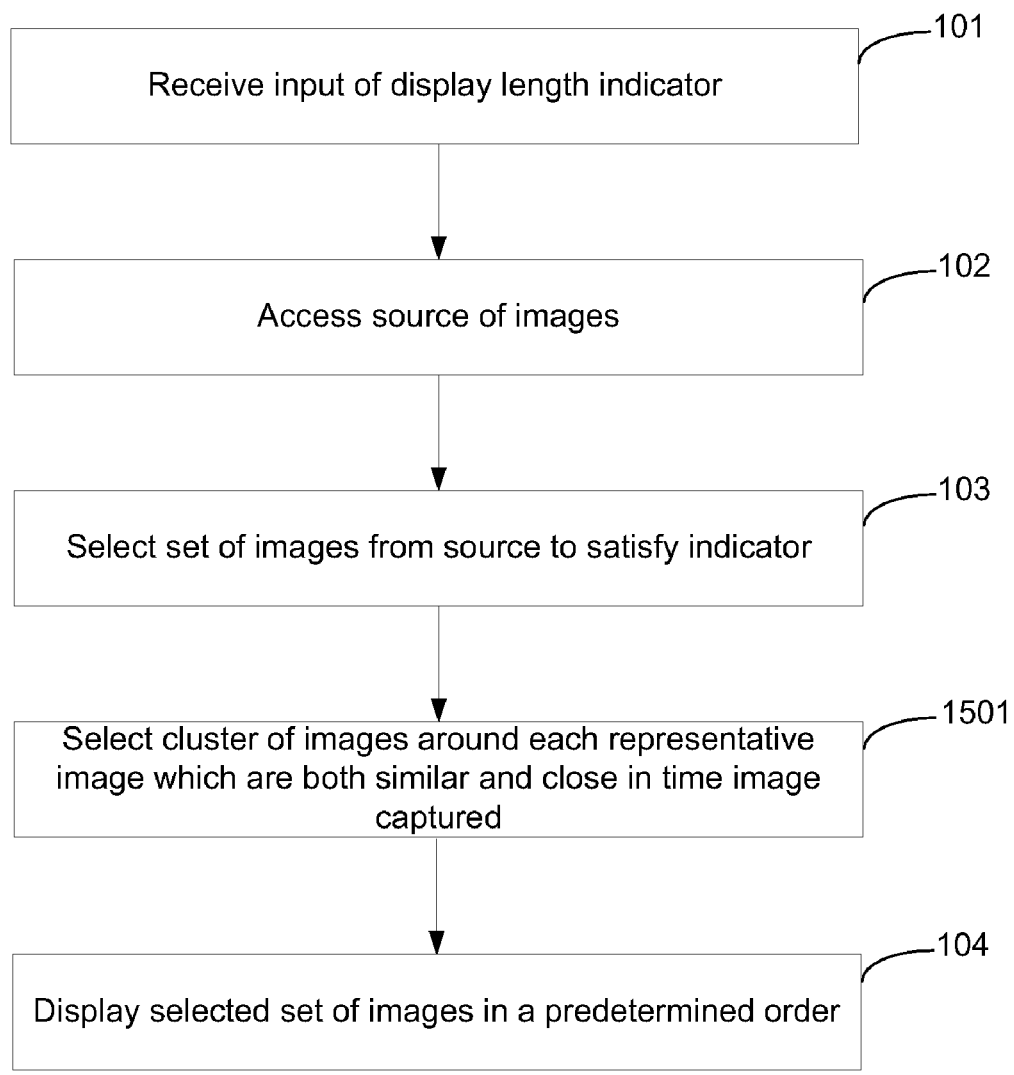
FIG. 15 is another example flow diagram of a method of playback of digital images.

In other examples, the display may comprise a combination of the techniques described above, with clusters of images being displayed for some representative images (e.g. in display areas 1401 and 1403) and not for others (e.g. in display area 1402).

Where the display uses the techniques described with reference to FIGS. 14 and 15, the display length indicator may have two aspects: the number of representative images (3 in the example shown) and the length (in time) of the display. Alternatively, one of these two parameters may be fixed and the display length indicator used to determine the other parameter.

The above description refers to images being displayed in chronological order. This is by way of example only and the images may be displayed in any predetermined order.

In addition to displaying the images, further display techniques may be used in combination with displaying the images, as indicated above in the enhanced features selection section 208 in the user interface shown in FIG. 2. Some digital cameras (e.g. SenseCam) also record short clips of audio, either automatically or as a memo feature, which is user initiated. These audio clips may be played back to the user in parallel with the image display. These audio clips may be stored in a source of audio clips, which may be co-located with the source of images 504. Where a large number of audio clips have been recorded during the period covered by the images in the source, a selection of audio clips may be performed such that only audio clips which are either associated with images selected as representative images (in step 103) are selected. As described above, images with associated audio clips may be considered more important and may therefore be more likely to be selected as representative images. In another selection example, audio clips recorded within a defined time interval (e.g. 2 minutes) of the time that a representative image was taken may be selected. Where the images are displayed in a moving manner (e.g. slide-show/flip-book/movie) the playing of audio clips may be synchronised with images taken at the same, or a similar time, to the representative image being displayed. This synchronisation may be approximate, particularly where the images are displayed sequentially and the length of audio clip exceeds the display time for an associated image. In order to play audio clips, the arrangement shown in FIG. 5 would need to further comprise a speaker.

To enhance the playback of the images, particularly when images are displayed sequentially, haptics may be used to provide the 'feel' of the experience portrayed in the images to the viewer. Haptics refers to the science which deals with the sense of touch and is also the term for physical sensors that provide a sense of touch at skin level and force feedback information to/from muscles and joints. Haptic interfaces have been used in aeroplanes to provide force feedback to pilots, in computer games and in virtual reality environments. Often this feedback is provided through a joystick arranged to provide resistance to movement and also to vibrate. Haptics is also being used to create medical simulators such that invasive procedures can be practised in a manner that is both simulated (i.e. away from a patient) and provides a realistic experience to the user.

Figure 16:
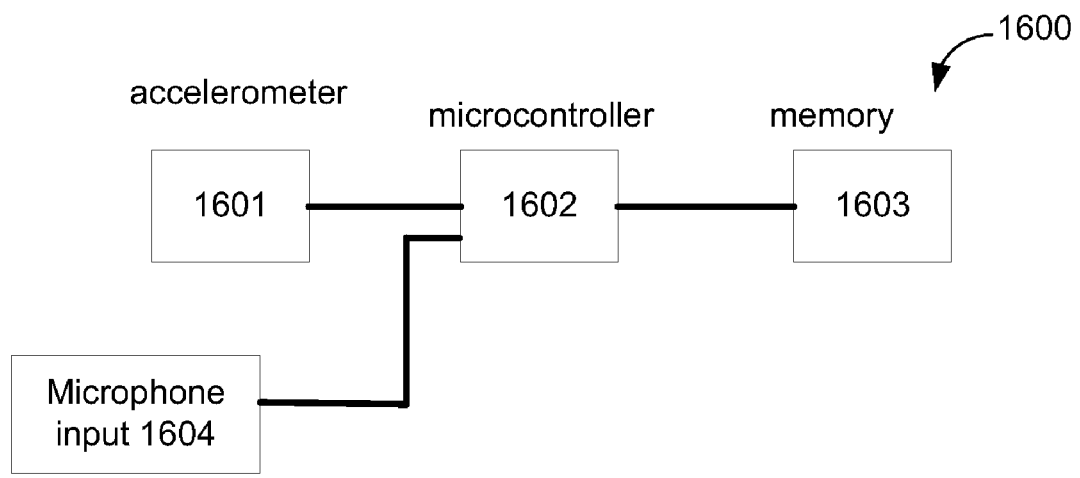
FIG. 16 shows a schematic diagram of apparatus for recording acceleration information.
Figure 17:
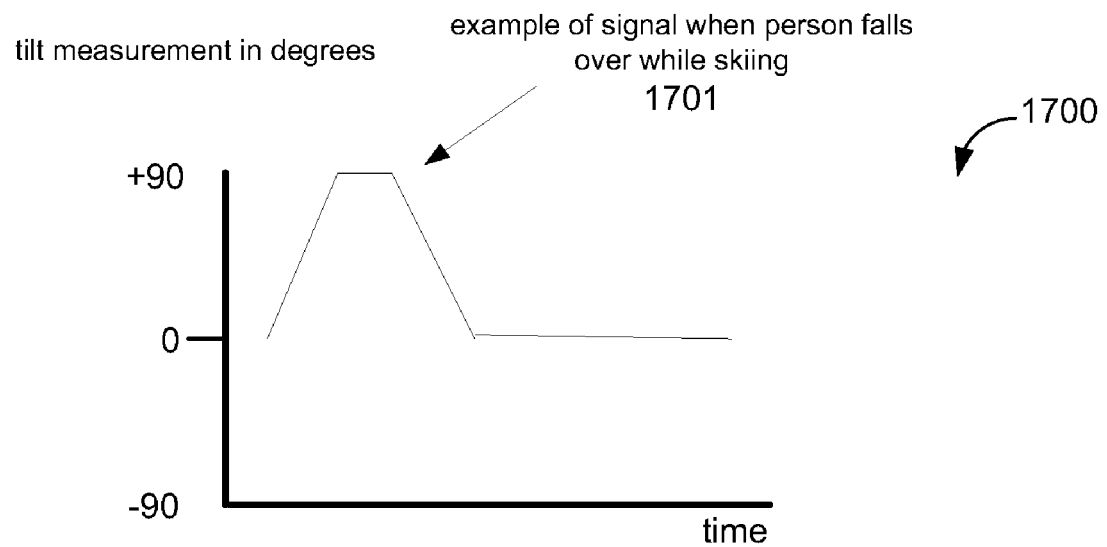
FIG. 17 shows an example graph of a tilt measurement determined from recorded acceleration data.

The use of haptics to enhance image playback can be described with reference to FIGS. 16-19. Haptics are used to regenerate motion recorded by an accelerometer or other sensor within the digital camera and to re-synthesise the motion using bass loudspeakers, a moving floor or other actuator. FIG. 16 shows a schematic diagram of apparatus 1600 that could be used in a digital camera to record acceleration information. The apparatus 1600 comprises an accelerometer 1601 or other means of detecting acceleration, a microcontroller 1602 (or microprocessor) and a memory 1603. If audio is also to be recorded (as described above), a microphone input 1604 is also provided. These elements may already be provided in the digital camera (e.g. in a SenseCam) and the elements may have several purposes, e.g. the memory may also be used to record images captured. The apparatus 1600 records the acceleration along one or more axes (e.g. along the x and y axes) periodically (e.g. every 10 ms). This data may be recorded, for example, as 10 bit values. FIG. 17 shows an example graph 1700 of the tilt measurement (in degrees) which is determined from the measured acceleration, for example recorded when a person was skiing. A fall experienced by the user whilst skiing is clearly visible on the graph 1701. Although FIG. 17 shows tilt measurements, raw acceleration data may be used in other examples.

Figure 18:
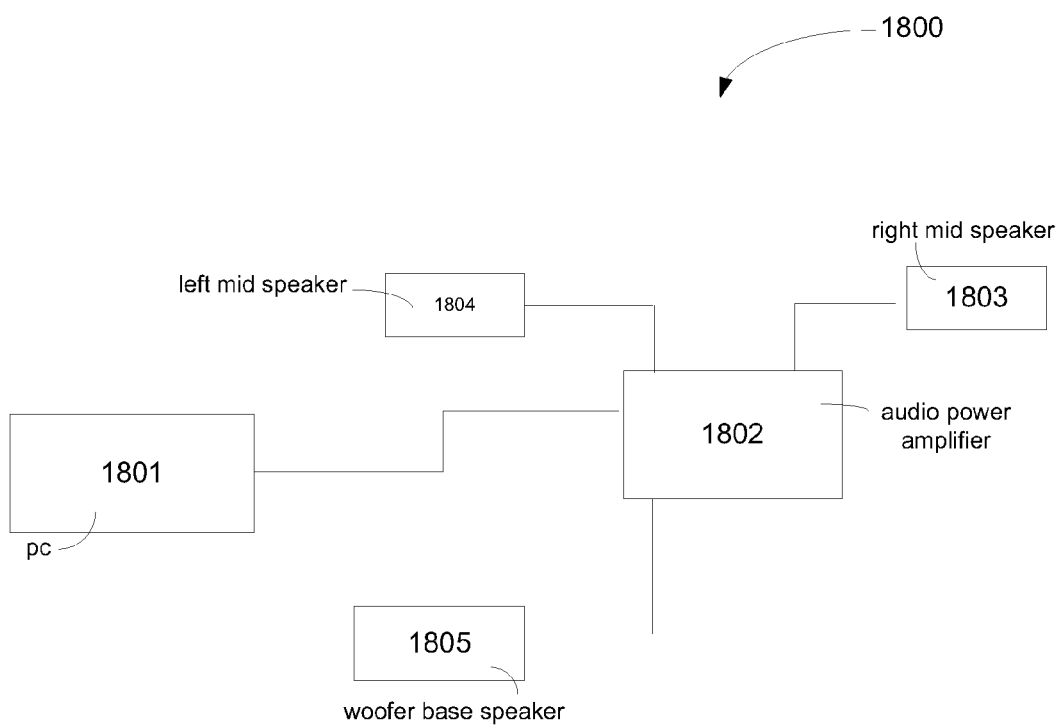
FIG. 18 shows a schematic diagram of a typical audio system of a home computer.

FIG. 18 shows a schematic diagram of a typical audio system 1800 of a home computer that may be used for enhanced playback using haptics. Other systems may be used for the enhanced playback and this is shown by way of example only. The system 1800 comprises a computer 1801 connected to an audio power amplifier 1802 which is in turn connected to two mid-speakers 1803, 1804 (one right, one left) and a woofer bass speaker 1805. In another example, two woofer bass speakers may be provided. This enables a degree of directionality for the vibration to be provided.

Figure 19:
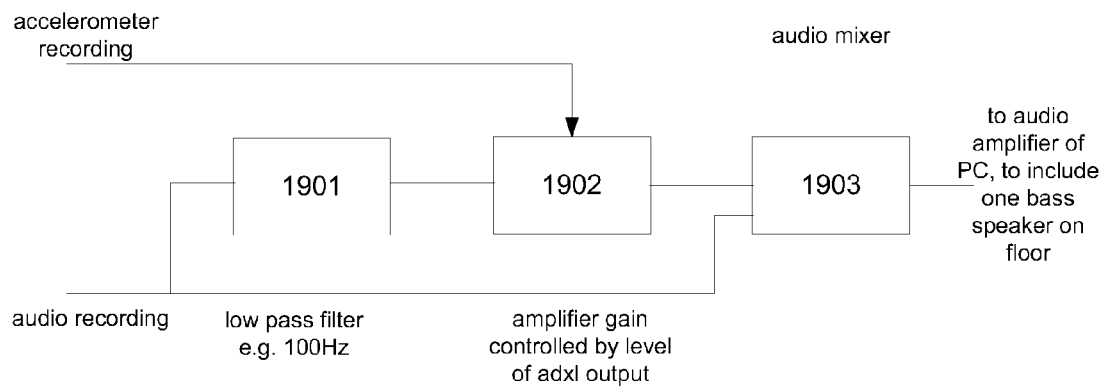
FIG. 19 shows a schematic diagram of an example of the signal processing steps for enhanced playback using haptics.

The signal (as shown in FIG. 17) is processed by the computer 1801 and the tilt data is used to amplify the audio track. For example, when the person falls, the tilt data is close to 90° and the low frequency (e.g. <100 Hz) audio recording of the fall is amplified. In this manner the real audio recording of the fall is enhanced to give a feeling through low frequency vibrations created by the bass speaker 1805. Examples of the signal processing steps, which would typically be performed by software, are shown in FIG. 19, in which part of the audio signal is tapped off and fed through a low pass filter 1901 (e.g. a 100 Hz low pass filter). An amplifier gain control element 1902 is then used to control the amplifier gain according to the level of the acceleration output. The output of the amplifier gain control element 1902 is then mixed with the original audio signal (in audio mixer 1903) and fed to the audio amplifier 1802 (in FIG. 18) which is connected to at least one bass speaker 1805, ideally located on the floor. This bass speaker 1805 creates vibrations in the floor and provides the additional sensory information to the viewer of the images.

The provision of additional sensory information, as described above, may be synchronised with the display of images (and playing of audio clips, where appropriate). Where the images are displayed in a moving manner (e.g. slide-show/flip-book/movie) the provision of additional sensory information may be synchronised with images taken at the same, or a similar time, to the representative image being displayed. This synchronisation may be approximate, particularly where the images are displayed sequentially and the length of time of provision of the additional sensory information clip exceeds the display time for an associated image.

In the example shown in FIG. 19 the acceleration information is used in combination with the recorded audio to enhance the audio and provide 'feel' to the images. In another example the audio may not be used and the acceleration information may be used on its own to generate low frequency audio which can be played on the bass speakers and create vibrations that can be felt by the viewer. In such a situation, cones of a loudspeaker may be driven with opposite polarity signals in a time sequence (e.g. in the form of a square wave or similar) to achieve a large 'thump' feeling to the viewer.

The examples described above with reference to FIGS. 16-19, bass speakers were used to re-create vibrations experienced by the person with the digital camera. As described above, other actuators may be used to re-create the vibrations in addition to or instead of the bass speakers, such as a moving floor, actuators built into a chair, actuators built into a joystick etc.

In addition to, or instead of, using acceleration data to produce vibrations as described above, other sensor data that may be recorded by the digital camera may be mapped to other actuators. For example, wind noise could be generated and played over standard speakers to give an impression of speed, fans could be used to create draughts to give an impression of speed, environmental sensor data could be mapped to climate control apparatus (e.g. air-conditioning, central heating) and light level data could be mapped to lighting apparatus.

The use of haptics to enhance playback of digital images as described above may be used in combination with some or all of the techniques described above with reference to FIGS. 1-15. Alternatively, haptics may be used in conjunction with any other methods of digital image playback.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A method of displaying digital images comprising:
receiving a display length indicator that includes an image difference threshold;
accessing digital images;
selecting a set of digital images from the accessed digital images in accordance with the display length indicator and predefined selection criteria; and
displaying the selected set of digital images in a predetermined order.

2. A method according to claim 1, wherein the digital images are digital photographs.

3. A method according to claim 1, wherein the predetermined order is chronological order.

4. A method according to claim 1, wherein the display length indicator further comprises a number of images.

5. A method according to claim 1, wherein the accessing digital images comprises:
accessing digital images; and
limiting the accessed digital images to images captured in a defined time period.

6. A method according to claim 1, wherein the selecting the set of digital images comprises:
determining a number of images to be displayed from the display length indicator; and
selecting the number of images from the accessed images in accordance with at least one of a time stamp associated with each image and a property of each image.

7. A method according to claim 6, wherein the selecting the number of images comprises:
selecting a first image from the accessed images according to specified criteria;
selecting a further image from the accessed images which gives an extreme value of a predefined energy parameter; and
repeating the step of selecting a further image until the determined number of images have been selected.

8. A method according to claim 7, wherein the energy parameter is defined with respect to an importance factor and a similarity factor, and wherein the importance factor is a measure of one or more image attributes and a similarity factor is a measure of the difference between two images.

9. A method according to claim 8, wherein the importance factor is a measure of one of more of: presence of a face in an image; degree of interest of an image; and sharpness of an image.

10. A method according to claim 1, wherein the displaying of the selected set of digital images comprises:
displaying the selected set of digital images sequentially in the predetermined order.

11. A method according to claim 1, further comprising:
accessing audio clips;
selecting one or more audio clips associated with the selected digital images; and
playing the selected audio clips in parallel to displaying the selected set of digital images.

12. A method according to claim 1, further comprising:
accessing sensor data;
selecting parts of the sensor data associated with the selected digital images;
processing the selected parts of sensor data to provide a sensory feedback signal; and
outputting the sensory feedback signal in parallel to displaying the selected set of digital images.

13. A method according to claim 12, wherein the sensor data comprises acceleration data; the sensory feedback signal comprises a low frequency audio signal and outputting the sensory feedback signal comprises:
outputting the low frequency audio signal to a sensory actuator in parallel with displaying the selected set of digital images.

14. A method according to claim 13, wherein processing the selected parts of sensor data comprises:
accessing an audio clip;
filtering the audio clip using a low pass filter to produce a low frequency audio signal; and controlling the amplification of the low frequency audio signal according to the acceleration data.

15. A method according to claim 14, further comprising: playing the audio clip in synchronicity with outputting the low frequency audio signal to a sensory actuator.

16. A method according to claim 15, wherein the sensory actuator comprises a bass speaker.

17. An apparatus for displaying digital images comprising:
a user input device;
a processor arranged to receive a display length indicator from the user input device, to access digital images and to select a set of digital images from the accessed digital images in accordance with the display length indicator and predefined selection criteria, the display length indicator comprising an image difference threshold; and
a display for displaying the selected set of digital images in a predetermined order.

18. An apparatus according to claim 17, wherein the predetermined order is chronological order.

* * * * *